Feb. 20, 1923.
W. J. KENT
1,445,626
METHOD OF MAKING TIRES FOR CARPET SWEEPERS
Filed Feb. 21, 1920
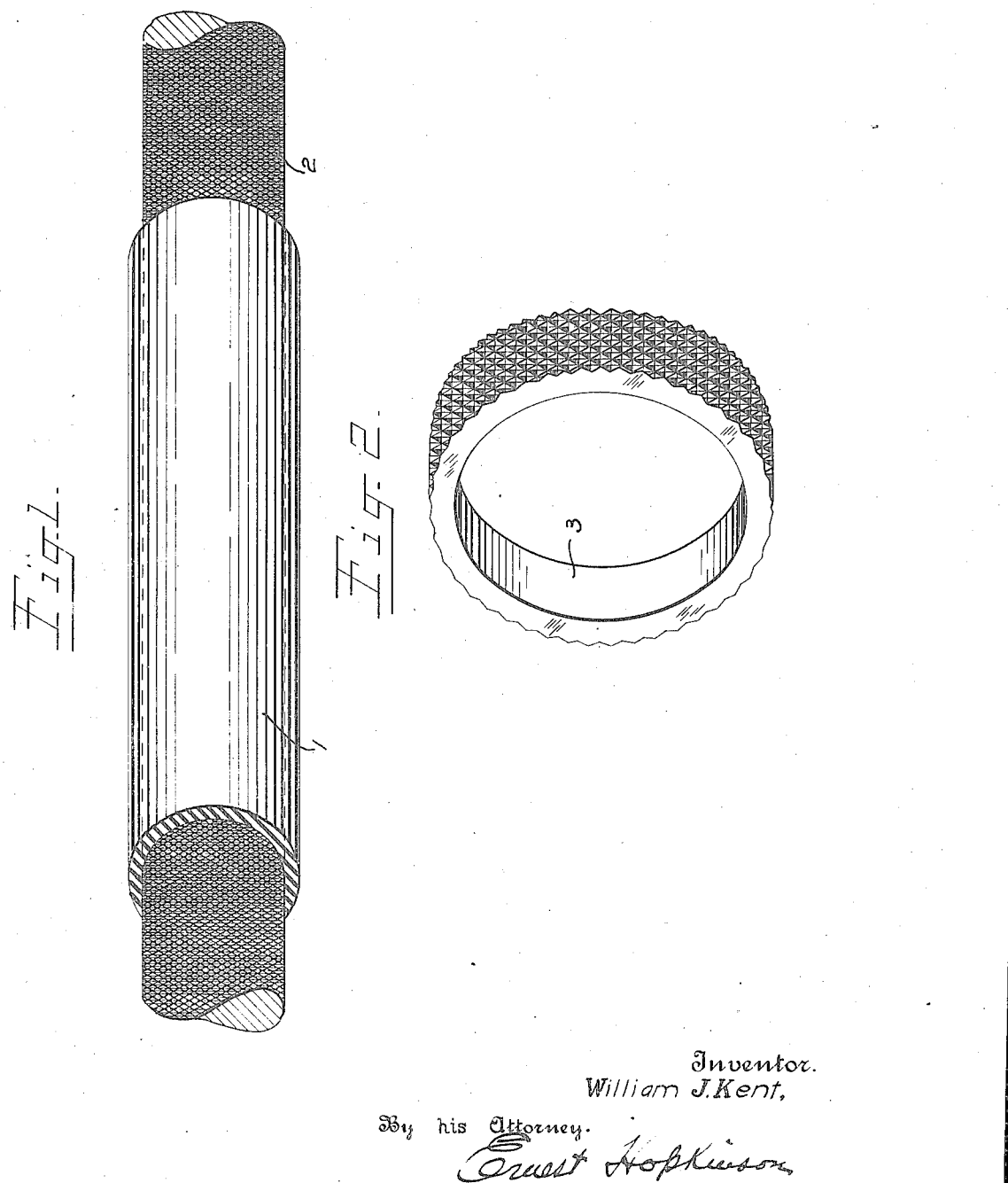
Inventor.
William J. Kent,
By his Attorney.
Ernest Hopkinson Patented Feb. 20, 1923.

1,445,626

UNITED STATES PATENT OFFICE.

WILLIAM J. KENT, OF BROOKLYN, NEW YORK, ASSIGNOR TO THE MECHANICAL RUBBER COMPANY, A CORPORATION OF NEW JERSEY.

METHOD OF MAKING TIRES FOR CARPET SWEEPERS.

Application filed February 21, 1920. Serial No. 360,509.

*To all whom it may concern:*

Be it known that I, WILLIAM J. KENT, a citizen of the United States, residing at Brooklyn, county of Kings, and State of New York, have invented certain new and useful Improvements in Methods of Making Tires for Carpet Sweepers, of which the following is a full, clear, and exact description.

This invention relates to a method of making tires for carpet sweepers or vacuum cleaners.

The tires for carpet sweepers and vacuum cleaners as ordinarily made are small rubber rings having a roughened outer surface or tread, which is essential, as in many of them parts of the mechanism are driven by the wheels on which these tires are mounted. It is therefore necessary that there be a good frictional contact with the surface over which the machine is being run. By the previously known method these tires are made by forming a tube of rubber on a plain mandrel, wrapping it with a heavy grade of canvas, and vulcanizing. This heavy canvas or duck, owing to its rough surface, forms a rough outer surface on the tube. After vulcanizing, the canvas is stripped from the tube, the latter removed from the mandrel, and cut into small sections of suitable size to fit the wheels of the carpet sweepers. This method is very expensive, as the canvas can be used for a short time only before being scrapped, and the grade used is very high priced.

The object of the present invention is to devise a method for making carpet sweeper tires or analogous articles in a simple and inexpensive manner, while retaining all the advantages obtained by the use of the canvas.

In the drawings, Fig. 1 is a perspective of a mandrel used in carrying out my method, showing a broken away rubber tube thereon.

Fig. 2 is a perspective of a finished tire.

In carrying out my method a tube 1 of rubber is formed upon a roughened mandrel 2, and vulcanized in the ordinary manner. The tube is then stripped from the mandrel, and cut into sections of the required size to form the tire, which are then turned inside out, as shown at 3 in Fig. 2. In certain conditions it may be desirable to make the tubes or rings 1 of the size required in the finished article, particularly in the case where they are to be of considerable length, and in this event the step of cutting the tube into proper sizes will be unnecessary. It is obvious that the surface of the mandrel may be given any roughened configuration that will produce the desired tread on the finished and inverted tube.

While this method is particularly designed to produce tires for carpet sweepers or vacuum cleaners, it is obvious that it is of more general application and may be used whenever it is desired to produce a ring having a roughened outer surface adapted for frictional contact, such as the small, soft rubber rings placed on the finger knobs at the ends of typewriter platens, or for any other purpose requiring such rings.

Having thus described my invention, what I claim and desire to protect by Letters Patent is:

The method of making rubber tires for carpet sweepers, which comprises forming and final curing a relatively long and uniform gage rubber tube on a mandrel adapted to give to the inner surface of the tube the desired tread configuration, stripping the tube from the mandrel, cutting the tube into portions of the desired width, and inverting each portion to present its roughened inner surface as an outer tread surface and form a completed tire.

Signed at New York city, New York, this 16th day of February, 1920.

WILLIAM J. KENT.